Sept. 21, 1943. J. S. CLAPPER 2,329,881
ROAD SIDE MOWER
Filed March 28, 1941 4 Sheets-Sheet 2

FIG.2  FIG.3  FIG.4  FIG.5

INVENTOR
JOHN S. CLAPPER
BY Paul, Paul & Moore
ATTORNEY

Sept. 21, 1943.　　　J. S. CLAPPER　　　2,329,881
ROAD SIDE MOWER
Filed March 28, 1941　　　4 Sheets-Sheet 3

INVENTOR
JOHN S. CLAPPER
BY Paul, Paul & Moore
ATTORNEY

Patented Sept. 21, 1943

2,329,881

UNITED STATES PATENT OFFICE 2,329,881

ROADSIDE MOWER

John S. Clapper, Minneapolis, Minn., assignor to Toro Manufacturing Corporation of Minnesota, Minneapolis, Minn., a corporation of Minnesota Application March 28, 1941, Serial No. 385,771

15 Claims. (Cl. 56—25)

This invention relates to new and useful improvements in mowing machines of the sickle bar type used for mowing vegetation and rank growth along roadsides, and is a further development of the mowers shown and described in my co-pending application, Serial No. 320,920, filed February 26, 1940, and the co-pending application of Amos F. Moyer, Serial No. 326,918, filed March 30, 1940.

Many of the parts illustrated in the present application are shown and described in detail in the aforesaid co-pending applications and therefore need not be described in detail herein.

It is usually customary in mowers of this type to carry the sickle bar on a power propelled vehicle, such as a tractor, and utilize the motor of the tractor for supplying power for effecting the various functions of the sickle bar, such as reciprocating the sickle or cutting knife; adjusting the cutting position of the sickle bar relative to the ground and in conformity with varying inclinations of roadside shoulders and ditches; and for elevating the sickle bar to clear obstructions which may be in the path thereof.

Under such an arrangement the reciprocal movement of the sickle depends more or less upon the traveling movement of the tractor which movement varies with the conditions of the road. For example, when traveling over rough or soft roads, or steep slopes and through heavy growth, the tractor speed must necessarily be reduced, which usually produces a reduction in sickle speed. However, the nature of the growth might demand a rapid reciprocal movement to completely sever the growth engaged and such reduction, accordingly, is productive of an inefficient mowing operation.

In mowers where the sickle is driven from the tractor motor, it frequently happens, even when means are provided for varying the speed of the sickle bar with respect to the traveling movement of the tractor or vehicle, that the sickle cannot be operated fast enough to produce a clean cut without taxing the tractor beyond its safe operating load, particularly when the grass or growth being cut is heavy and hard to cut.

The reciprocal speed of the sickle should be such as to produce a clean cut, regardless of the nature of the growth being cut, it being understood that light growth may require fewer reciprocations of the sickle per unit of advance of the tractor to produce a clean cut, than when operating in heavy growth.

To assure efficient operation of the sickle, it is therefore essential that the mower be so constructed that the sickle may be operated at the proper speed to effect efficient cutting of the growth, regardless of the nature thereof, and independently of the traveling speed of the tractor. In other words, the sickle should, at all times, be reciprocated fast enough to cleanly cut all grass or growth engaged thereby, but not too fast to cause undue vibration in the machine, which may result in rapid wear of the operating parts.

Another factor to be considered in roadway mowing is that of expeditious operation, which determines, to a large extent, the cost of performing such operations.

In the novel mower herein disclosed, an independent motor is provided for driving the sickle, as well as furnishing power for adjusting the sickle bar from one position to another, whereby the operator of the tractor or vehicle may readily and quickly shift the position of the sickle bar to clear sign posts, trees, or other fixed objects located in the traveling path of the sickle bar, by the simple manipulation of one or more control levers located convenient to the operator's seat. All such adjustments may be expeditiously accomplished without retarding or interrupting the traveling movement of the tractor. It is therefore highly desirable that means be provided whereby all of the operations of the sickle bar including the positioning thereof relative to the ground, and the driving of the sickle may be accomplished by a power unit which is wholly independent of the usual motor for propelling the tractor or vehicle.

An important object of the present invention therefor is to provide a road side mowing machine in which the supporting vehicle is provided with a motor for propelling it, and a second motor is provided for operating the sickle and positioning the sickle bar relatively to the ground, whereby the operation of the sickle and substantially all of the operations of the sickle bar may be expeditiously accomplished by power independently of the power for propelling the tractor or vehicle.

Another important object of the invention is to provide a mower of the class described, having a flexible drive for driving the sickle, which drive is not affected by adjustments of the sickle bar or movements thereof over the ground surface, whereby the sickle may be operated, regardless of the position of the sickle bar.

A further object is to provide a mowing machine of the class described comprising a drive shaft mounted on the vehicle frame, and a pitman shaft supported for translatory movement with respect to the vehicle and ground, and having a flexible driving connection with said drive shaft, said driving connection including a floating countershaft having means for maintaining it in fixed spaced relation to the drive and pitman shafts, whereby the position of the pitman shaft with respect to the drive shaft or ground will not affect the operation of said flexible drive.

A further object is to provide a power driven mower comprising a tractor having a motor mounted thereon for propelling it, and a swing frame being pivoted to the tractor frame and having a pitman shaft rotatably mounted therein, and a sickle bar being pivoted to the swing frame in the axis of the pitman shaft, whereby the sickle bar is adjustable for swinging movement in a vertical plane about the axis of the pitman shaft, and a second motor being mounted on the tractor frame and having a driving connection with the pitman shaft, whereby the sickle of the sickle bar may be operated by said second motor independently of the tractor motor, and mechanism operatively connecting the swing frame and sickle bar with said second motor whereby the power of said second motor may be utilized for vertically adjusting the sickle bar relatively to the ground and during traveling movement of the apparatus.

A further object is to provide an apparatus of the class described comprising means for selectively adjusting the sickle bar and its swing support to a plurality of positions with respect to the vehicle frame under power of a motor which is independent of the power source of the vehicle.

A further object is to provide improved means for locking the sickle bar in any one of a plurality of selected positions with respect to the vehicle frame, which means is located convenient to the operator's position on the mower.

Other objects of the invention will appear from the following description and accompanying drawings and will be pointed out in the annexed claims.

In the accompanying drawings there has been disclosed a structure designed to carry out the various objects of the invention, but it is to be understood that the invention it not confined to the exact features shown as various changes may be made within the scope of the claims which follow.

In the selected embodiment of the invention here shown, there is illustrated in dotted lines, for purposes of disclosure, a tractor, generally designated by the numeral 10, which provides a support for my improved mowing machine. It is to be understood that any other type of automotive vehicle, suitable for the purpose, may be used, if desired. The tractor 10 is shown comprising a front axle 11 having front wheels 12 mounted thereon adapted for steering movement by a suitable steering mechanism, partially shown at 13 in Figure 2, and operable by a steering wheel 14, shown in Figures 1 and 6. The tractor further has a rear axle differential housing 15, upon which is mounted the usual rear drive wheels 16 and 17. The drive wheels are driven from the usual tractor motor 18 through a speed change transmission 19, shown having a propeller shaft 20 connecting it to a rear axle speed change transmission 21, mounted on the differential housing 22. The transmission 21 is connected internally to the differential, and the drive from the differential to the drive wheels 16 and 17 may be of conventional type. The tractor chassis is shown comprising side frame members 23 connected together by a front cross member 25 and a cradle member 26, which cooperate to support the power unit or motor 18 of the tractor.

Figures 6, 7, 8, 9:
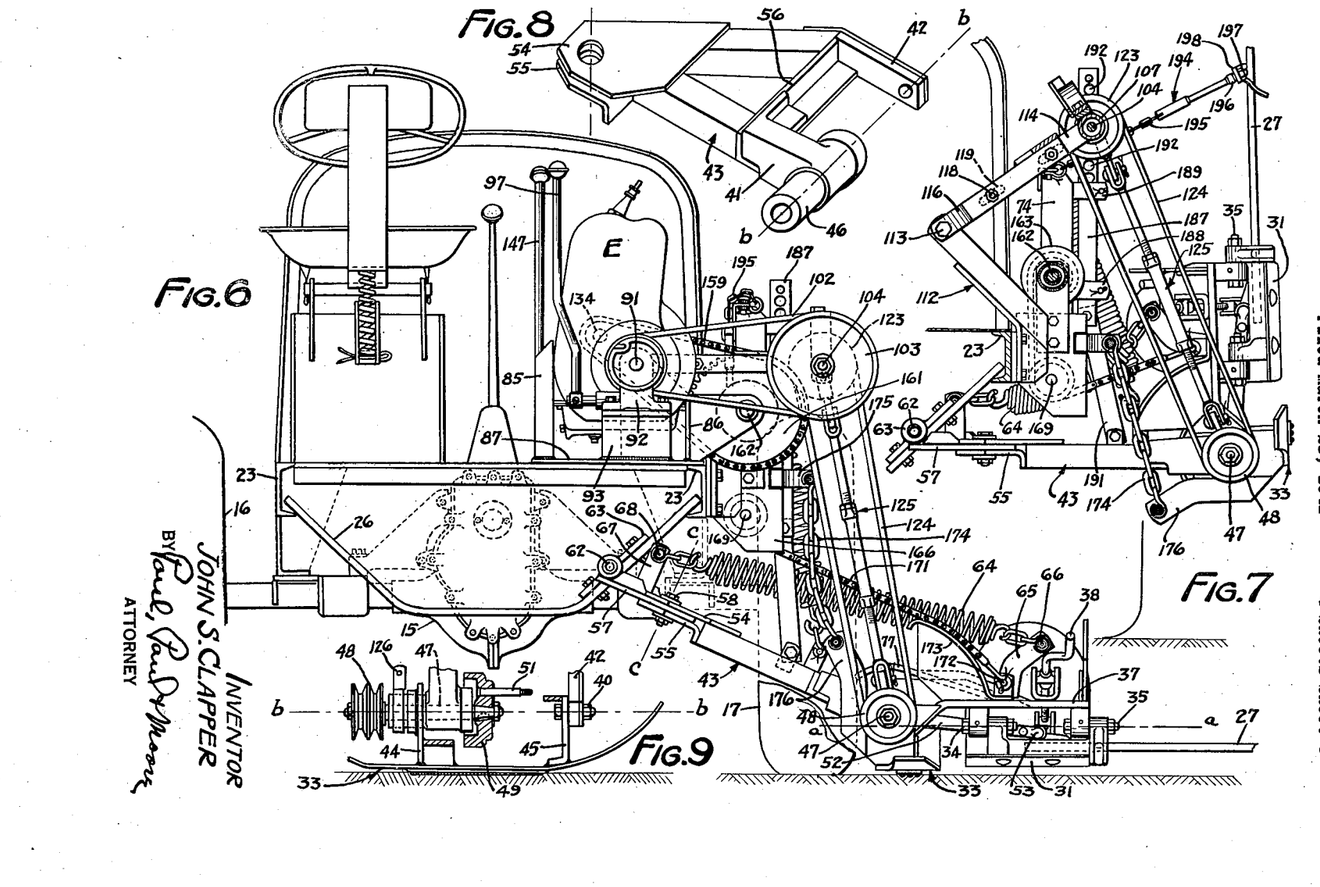
Figure 6 is a rear elevational view of the machine showing the sickle bar in horizontal operable position.
Figure 7 is a detail sectional view on the lines 7—7 of Figure 2, showing the sickle bar in vertical inoperative position.
Figure 8 is a perspective view of the swing frame removed from the mower.
Figure 9 is a fragmentary view substantially on the line 9—9 of Figure 2, showing the pivotal connection between the swing frame and the sickle bar.

The power mowing machine herein disclosed is shown comprising a sickle bar, generally designated by the numeral 27 which is similar to the one shown and described in the aforementioned pending application of Amos F. Moyer. The sickle bar is shown mounted at the right hand side of the tractor and comprises a sickle 28 mounted for reciprocal movement thereon with respect to the usual guards 29 of the sickle bar. The sickle bar is shown provided with inner and outer ground engaging shoes 31 and 32, respectively, and is pivoted to a sickle head, generally designated by the numeral 33, by pivots 34 and 35, whereby the sickle bar is pivotally adjustable about the axis a—a of the pivots 34 and 35, as will be understood by reference to Figures 2 and 6. The pivots 34 and 35 are supported on a plate-like member 37 forming a part of the sickle head 33, as shown in Figure 6. A suitable crank 38 is mounted on the member 37 and has a connection with the forward end of the inner shoe 31 of the sickle bar, as shown at 39, whereby the sickle bar may be conveniently tilted about the axis a—a to adjust its angle of incidence with respect to the ground.

The sickle head 33 is pivotally mounted on the outer extremities 41 and 42 of an A-shaped swing frame, generally indicated by the numeral 43 which, in turn, is pivoted to the tractor frame, as will subsequently be described. The sickle head, as best shown in Figure 9, is provided with upstanding lugs or members 44 and 45, the former providing a bearing for the trunnion 46 of the swing frame, and the member 45 providing a pivotal support for the leg 42 of the swing frame by means of a pivot 40.

Figures 2, 3, 4, 5:
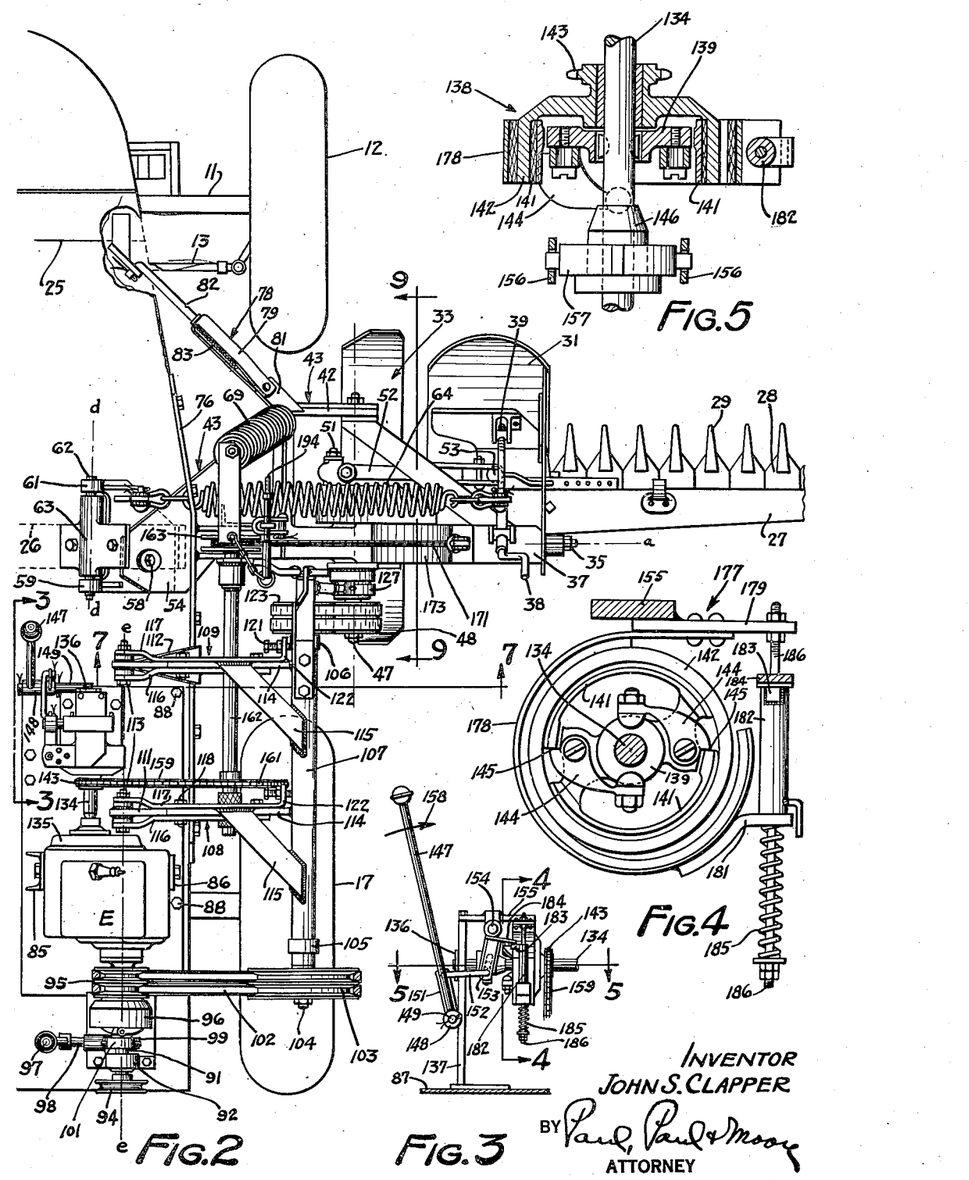
Figure 2 is a plan view of the mowing machine, a portion of the vehicle only being shown in dotted lines.
Figure 3 is a detail sectional view on the line 3—3 of Figure 2, showing the sickle bar lifting mechanism.
Figure 4 is a detail sectional view on the line 4—4 of Figure 3, on a larger scale.
Figure 5 is a detail sectional view on the line 5—5 of Figure 3 on a larger scale.

A pitman shaft 47 is rotatably mounted in the trunnion 46 and has a pair of pulleys or sheaves 48 secured to one end thereof. A crank disk 49 is secured to the opposite end of the pitman shaft 47, and carries a crank pin 51. A suitable pitman 52 has one end pivotally connected to the crank pin 51 and its opposite end has a ball and socket connection 53 with the inner end of the sickle 28, as shown in Figures 2 and 6. The pivot pin 40, as shown in Figure 9, is axially alined with the pitman shaft 47, whereby the sickle bar may be pivotally adjusted about an axis b—b which is coincident with the alined axes of the pitman shaft 47 and pivot 40, as will readily be understood by reference to Figures 6 and 9. By pivotally mounting the sickle bar, as above described, the angular position thereof with respect to the ground does not affect the operation of the pitman 52, whereby the sickle bar may follow the contour of the ground and the inclination of shoulders without interfering with the operation of the pitman and sickle.

The inner end of the swing frame is shown comprising spaced plates 54 and 55 suitably secured to the inner ends of the legs 41 and 42 of the swing frame by such means as welding. A suitable cross member 56 secures together the outer ends of the legs 41 and 42, as best shown in Figure 8. The swing frame is pivotally connected to a plate 57 by a pivot pin or bolt 58, the plate 57 being received between the plates 54 and 55 of the swing frame, as best shown in Figure 6. The plate 57 is provided with spaced lugs 59 and 61 apertured to receive a pivot pin or rod 62 mounted in a bracket 63 shown secured to the cradle member 26 of the tractor frame. By thus connecting the swing frame to the tractor frame, the sickle bar and swing frame may swing in a horizontal direction about the axis c—c of the pivot pin 58, shown in Figure 6, and is also adapted for vertical swinging movement about the axis d—d of the pivot pin 62, shown in Figure 2.

Figure 1:
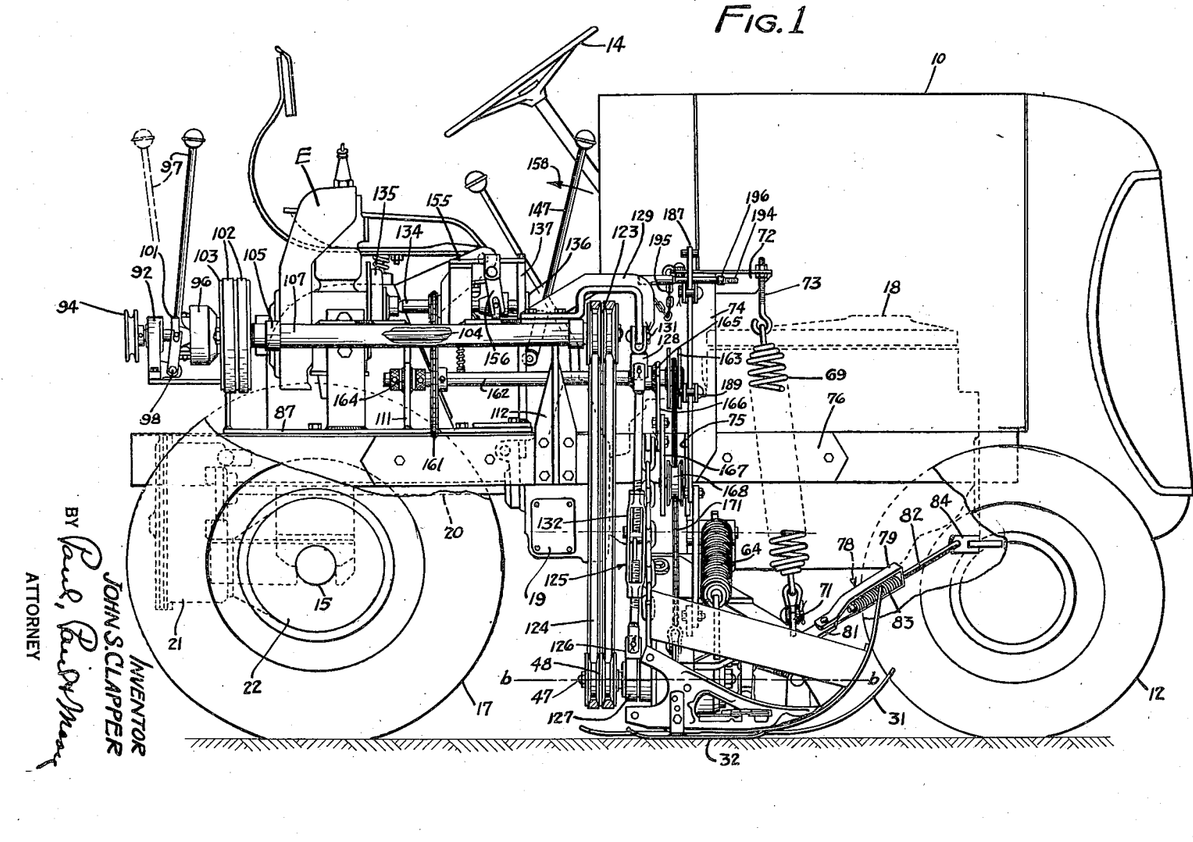
Figure 1 is a side elevation showing my improved mowing machine, the vehicle or tractor being shown in dotted lines.

Means is provided for counterbalancing the sickle bar 27 on the swing frame, and is shown comprising a suitable spring 64 having one end connected to the upper end of an upright lug 65, secured to the plate-like member 37 of the sickle head by a pin 66. The opposite end of the spring 64 is connected to an upright lug 67, shown provided on the plate 57, as shown at 68 in Figure 6. Means is also provided for counterbalancing the weight of the sickle bar, sickle head, and outer end of the swing frame, whereby a portion of the weight of these parts may be transmitted to the tractor frame. The means for thus counterbalancing the sickle head and sickle bar is shown comprising a substantially vertically disposed spring 69, having its lower end connected to a lug 71 provided on the forward end of the swing frame, and its upper end to an offset angle bracket 72 by a suitable hook bolt 73, whereby the tension in the spring may be adjusted in accordance with the weight to be counterbalanced thereby. The angle bracket 72 is secured to the upper end of an upright post 74, preferably of angle iron cross-section, and has its lower end suitably secured to a plate 75, fixed to a longitudinally extending plate 76, suitably secured to one of the side frame members of the tractor frame, as shown in Figures 1 and 2. An arcuately formed plate 77 is provided on the sickle head 33, directly below the spring 64, and serves to space the spring 64 from the axis of the pitman shaft 47, when the outer end of the sickle bar drops to a position below the horizontal, whereby the counter-balancing effect of the spring 64 is retained, regardless of the angular position of the sickle bar below the horizontal.

The sickle bar and sickle head, as hereinbefore stated, are mounted for horizontal swinging movements about the axis c—c at the upper end of the swing frame 43, thereby to avoid damage to the sickle bar, should it strike an obstruction, while in operation. The sickle bar and swing frame are normally retained in right angular relation to the direction of travel of the tractor by a suitable yieldable draw bar, generally indicated by the numeral 78 in Figure 2. This draw bar is shown comprising an elongated clevis 79 having its lower end pivotally connected to a lug 81 provided on the forward portion of the swing frame 43. A rod 82 is shown having its lower end slidably connected to the upper end of the clevis 79, and has a suitable spring 83 coiled thereabout within the clevis, means being provided at the lower end of the rod for retaining the rod in the spring. The upper end of the rod 82 is pivotally connected to a suitable bracket 84 secured to the tractor frame. The tension in the spring 83 is sufficient to retain the sickle bar in its normal operating position, as shown in Figure 2, but permits rearward swinging movement of the sickle bar when the latter engages a fixed obstruction.

An important feature of the present invention resides in the provision of power means for driving the sickle and vertically adjusting the position of the sickle bar and sickle head, whereby such operations may be performed independently of the power of the tractor motor. The means provided for thus effecting the various operations of the power mower comprises an auxiliary motor, designated by the letter E. This motor is shown mounted on upright supporting members 85 and 86 secured to a base plate 87 which, in turn, is suitably secured to the tractor platform, by such means as bolts 88, as will be understood by reference to Figures 2 and 6. The motor E has a conventional governor control, not shown, manually adjustable to vary the speed of the motor within a limited range of load variations. Consequently, the motor speed may be adjusted for any particular type of growth, and is not dependent upon the traveling movement of the tractor.

In the embodiment of the invention as here shown, the shaft of the motor E is provided with an extension 91, which is rotatably supported in a bearing bracket 92, removably secured to a support 93 which may be welded to the base plate 87, as shown in Figure 6. For convenience, the extension shaft 91 and the shaft of the motor E will hereinafter be referred to as the motor drive shaft. A suitable starting pulley or sheave 94 is secured to the outer end of the drive shaft 91 adapted to receive a suitable rope for starting the motor.

A double sheave or pulley 95 is mounted for free rotary movement on the drive shaft 91 and is operatively engageable therewith by a suitable clutch, generally designated by the numeral 96. The clutch 96 may be of conventional construction, and comprises cooperating members, one being fixed to the drive shaft 91 and the other secured to the pulley 95. The clutch is controlled by a suitable shift lever 97, conveniently operable from the driver's seat or position on the tractor. The shift lever is secured to a shaft 98 carrying a clutch fork 99 which is operatively engaged with a suitable clutch collar 101 which, in turn, is operatively engaged with the usual friction elements of the clutch. The parts are so arranged that when the shift lever 97 is moved forwardly to the full line position shown in Figure 1, the clutch is rendered operable to drive the pulley 95, and when moved rearwardly to the dotted line position in the same figure, the driving connection between the clutch and the pulley 95 is interrupted.

Another important feature of the invention resides in the means provided for transmitting power from the auxiliary motor E to the pitman shaft 47, whereby the sickle 28 may be operated, regardless of the angular position of the sickle bar with respect to the tractor. The means provided for thus transmitting power from the engine E to the sickle, comprises a flexible drive, preferably including a pair of V-belts 102 having driving connections with the double pulley 95 and a double pulley 103 secured to one end of a countershaft 104, shown mounted in suitable bearings 105 and 106 provided in a tubular bearing housing 107. The bearing housing is provided with laterally extending spaced parallel arms 108 and 109 having their inner ends pivotally connected to brackets 111 and 112, by suitable pivot bolts or pins 113. The bracket 111 is shown secured to the base plate 87 of the motor E and the bracket 112 may be suitably secured to the elongated plate 76, as shown in Figure 1. The pivot pin or bolts 113 are axially alined with the motor drive shaft 91, whereby the countershaft 104 is mounted for swinging movement about an axis e—e, which is coincident with the axis of the motor drive shaft 91. By thus mounting the countershaft 104, it may be oscillated about the axis e—e, without effecting the driving engagement of the belts 102 with the pulleys 95 and 103.

The arms 108 and 109 are longitudinally adjustable to tension the belts 102. To thus vary the length of the arms, each comprises a member 114 having one end secured to the bearing housing 107 and suitably braced thereto by braces 115. The opposite end portion of each arm is composed of spaced bars 116 and 117, between which the member 114 is fitted, as clearly illustrated in Figure 2. Suitable bolts 118 secure the bars 116 and 117 to the member 114 in adjusted position, it being understood that the arm members 114 are provided with suitable slots 119 for receiving the bolts 118, as indicated in dotted lines in Figure 7. Adjusting screws 121 are mounted in offset end portions 122 of each arm member 117 and engage the tubular bearing housing 107, as shown in Figure 2, and cooperate with the bolts 118 to retain the arms in adjusted position in a lengthwise direction.

Power is transmitted from the counter shaft 104 to the pitman shaft 47 by a double pulley 123 having V-belts 124 connecting it to the double pulley 48 secured to the pitman shaft, as shown in Figures 1 and 9. The spacing between the counter and pitman shafts 104 and 47, respectively, is maintained by an articulated connecting link, generally designated by the numeral 125. This connecting link has its lower end pivotally connected to a lug 126, shown secured to a collar 127 mounted on the trunnion 46 of the swing frame, as clearly illustrated in Figures 1 and 9. The upper end of the connecting link is pivotally connected to a coupling member 128 which, in turn, is pivoted to a bracket 129 by a pivot pin 131. The bracket 129 is secured to the bearing housing 107 and is so arranged that the axis of the pivot pin 131 is coincident with the axis of the counter shaft 104. A suitable turn-buckle 132 is provided in the connecting link 125, whereby it may be longitudinally adjusted to properly tension the belts 124 between the pulleys 123 and 48. The connecting link 125 serves to maintain a fixed distance between the axes of the pitman and counter shafts, whereby when the sickle head 33 is vertically adjusted, a corresponding movement is imparted to the counter shaft 104. Thus, a driving connection is always maintained between the belts 124 and pulleys 48 and 123. The pivotal connection 133 between the upper end of the connecting link 125 and the coupling block 128 permits rearward swinging movement of the sickle bar, as will readily be understood.

From the foregoing, it will be seen that the position of the sickle bar 27 and sickle head 33 with respect to the tractor body does not affect the driving connection between the sickle 28 and the motor drive shaft 91, because the arms 108 and 109 always maintain the drive shaft and counter shaft in fixed spaced relation and, in like manner, the connecting link 125 maintains a fixed distance between the counter shaft 104 and pitman shaft 47.

Means is provided for vertically swinging the sickle bar about the axis b—b of the pitman shaft 47 by the power of the auxiliary motor E and is shown comprising a slow speed shaft 134 having a driving connection with the motor E through a suitable speed reducer 135, shown in Figures 1 and 2. One end of the slow speed shaft 134 is supported in the speed reducer 135, and its opposite end is supported in a bearing 136 provided in a standard 137 secured to the base plate 87, shown in Figures 1 and 6. A suitable clutch, generally designated by the numeral 138 is mounted on the slow speed shaft 134 and comprises an inner member 139 which is keyed to the shaft 134 and comprises oppositely disposed friction shoes 141, shown in Figures 4 and 5. The clutch 138 also comprises an outer member or drum 142 which is mounted for relative rotation on the shaft 134 and has a suitable sprocket 143 secured thereto, as shown in Figure 5. Suitable means, not shown, is provided on the shaft for retaining the drum 142 in proper position on the shaft with respect to the inner clutch member 139.

A pair of dogs 144 are pivoted to the inner clutch member 139 and have operative connections with the friction shoes 141, as shown at 145 in Figures 4. A cone 146 is mounted for sliding movement on the shaft 134 adapted to engage and actuate the dogs 144, whereby the friction shoes are expanded into frictional driving engagement with the inner face of the drum 142. The cone 146 is arranged to be operated by a lever 147 having a hub 148 mounted on a horizontal rod or shaft 149 secured to the standard 137. An upright arm 151 is provided on the hub 148 and has a link 152 connecting it to an arm 153 secured to a rock shaft 154 mounted in suitable bearings provided in a bracket 155, having one end secured to the upper end of the standard 137. The rock shaft 154 carries a clutch-operating member 156 having its forked terminals engaged with a clutch collar 157 operatively associated with the cone 146, and whereby the cone may be moved into or out of operative engagement with the dogs, by oscillation of the lever 147. By thus operatively connecting the lever 147 with the cone 146, it will be noted, by reference to the drawings, that when the lever is in its forward position, as shown in Figures 1 and 2, the cone will be out of operative engagement with the dogs 144, whereby the shaft 134 idles freely in the clutch drum 142, it being understood that the cone is non-rotatably mounted on the shaft 134. Conversely, when the lever is moved in a rearward direction, as indicated by the arrow 150, shown in Figures 1 and 3, the clutch is rendered operable to drive the sprocket 143, whereby the sickle bar is swung upwardly about the axis b—b of the pitman shaft 47, as will subsequently be described.

The sprocket 143 has a chain 159 operatively connecting it to a relatively larger sprocket 161 secured to a shaft 162 which carries at its forward end, a winding drum, generally designated by the numeral 163. The rear end of the shaft 162 is shown supported in a bearing 164, and its forward end is supported in a bearing 165 provided in an upright bracket 166, as shown in Figure 1. The bracket 166 may be secured to a plate 167 which, in turn, is suitably secured to the supporting plate 76 by such means as welding. A suitable guide sheave 168 is rotatably mounted between the plates 75 and 167 and is supported on a short stud or shaft 169 carried by said plates. A chain 171 has one end secured to the winding drum 163 and is trained under the guide sheave 168 and has its opposite end secured to the plate-like member 37 of the sickle head 33 by a suitable pin 172, shown in Figure 6. The chain 171 is supported on a suitable quadrant 173 provided on the sickle head, which supports the chain in spaced relation to the pitman shaft 47, thereby to facilitate upwardly swinging the outer end of the sickle bar, when the shaft 162 is rotated by manipulation of the clutch lever 147. When the shaft 162 is thus rotated in one direction, the chain 171 is wound about the winding drum 163 with the result that the sickle bar is swung upwardly about the axis b—b of the pitman shaft 47, as hereinbefore stated.

Means is provided whereby when the shaft 162 is rotated to upwardly swing the sickle bar on its axis b—b, and the sickle bar reaches a predetermined position, continued rotation of the shaft 162 will cause the swing frame 43 to swing upwardly, as a unit, with the sickle bar and sickle head to permit the sickle bar to be swung to its transport position, as shown in Figure 7. When thus positioned, the sickle head and outer end of the swing frame will be elevated to a position clear of the ground, whereby the tractor and mower may be moved over comparatively rough ground, when moving from place to place.

The means provided for thus elevating the sickle head and swing frame, is shown comprising a chain 174 having its upper end secured to a fixed bracket 175 and its lower end to an arm 176 provided on the sickle head 33. In the operation of upwardly swinging the outer end of the sickle bar by rotation of the shaft 162, when the chain 174 becomes taut, upward swinging movement is imparted to the swing frame, as will readily be understood by reference to Figures 7 and 6, whereby the parts may be swung from the position shown in Figure 9 to that shown in Figure 7.

Means is also provided for controlling the return movement of the swing frame, sickle head, and sickle bar from the position shown in Figure 7 to the position shown in Figure 6, and comprises a suitable brake, generally designated by the numeral 177, and shown in Figures 3 and 4. This brake comprises a brake band 178 adapted to engage the periphery of the clutch drum 142. One end of the brake band 178 is secured to a fixed member 179, shown secured to the overhanging end of the bracket 155, shown in Figure 3. The opposite end portion of the brake band 178 has a suitable clip 181 secured thereto, shown carrying a tubular member 182 having an outwardly extending finger 183 adapted to be engaged by an outwardly extending lug 184 secured to the upper end of the arm 153, as shown in Figure 3. A suitable spring 185 is coiled about a rod 186, the upper end of which is secured to the member 179, as shown in Figure 4. The spring 185 constantly urges the lower end of the brake band 178 upwardly into frictional engagement with the drum 142.

The sickle brake 177 is operable by means of the clutch lever 147, as will be understood by reference to Figure 3. When the lever 147 is swung forwardly to a predetermined position, the lug 184 on the arm 153 will engage the finger 183 on the brake actuating member 182, whereby said member is thrust downwardly against the tension of the spring 185, whereby the brake band 178 is released from the drum 142. The arrangement of the brake band 178 with respect to the direction of rotation of the drum 142 is such that when the tubular brake actuating member 182 is released, and the spring 185 moves the band into frictional engagement with the drum, the combined forces imparted to the brake band 178 by the rotary movement of the drum 142 and the action of the spring 185, will cause the band to firmly grip the drum and interrupt rotation thereof. Thus, the brake 177 is self-energizing, and may be utilized to temporarily hold the swing frame and sickle bar in an elevated, inoperative position, as shown in Figure 7. The brake may also be used to control the downward movement of the swing frame and sickle bar to the operative position shown in Figure 6.

Means is also provided for positively locking the swing frame in the horizontal elevated position shown in Figure 7, and is shown comprising a vertically slidable bar 187 mounted for vertical sliding movement in suitable guides 188 and 189, provided on the upright angle iron post 74, shown in Figure 7. A link 191 connects the lower end of the bar 187 to the swing frame 43, as shown, whereby vertical sliding movement of the bar 187 will vertically swing the swing frame about the axis d—d. To secure the bar 187 in adjusted position, its upper end portion is shown provided with a plurality of spaced apertures 192 adapted to receive a locking pin or bolt 194 arranged to be inserted into a selected aperture 192 in the locking bar 187. The locking bolt, when inserted in an aperture 192, engages the upper guide 189, whereby the swing frame is positively locked against downward movement. The lock pin is preferably inseparably connected to the upper end of the post 74 by a suitable chain 195 which is of sufficient length to permit free manipulation of the lock pin 194. The lock pin 194 preferably has a shoulder 196 spaced inwardly from the adjacent terminal thereof, which terminal is threaded as shown in Figure 1 to receive a nut 197. By thus constructing the locking pin 194, it may be utilized to secure the sickle bar 27 in its upright inoperative position, as shown in Figure 7, by inserting the threaded terminal of the lock pin through a lug 190 secured to the sickle bar, and securing the nut 197 to the lock pin, as shown in Figure 7. When the sickle bar is thus engaged by the lock pin 196, the brake 177 may serve to support the swing frame and connected parts in the position shown in Figure 7. Also, inasmuch as the sickle bar cannot pivot about its axis b—b with the pin 194 as utilized in this manner, the chain 174 is held taut and the swing frame cannot lower, which, in fact, relieves the self-energizing brake of the load even as the pin, when associated with the bar 187 in any other swing frame position, relieves any strain on the brake.

*Operation*

In the operation of the novel power mower herein disclosed, the swing frame and sickle bar may normally be supported in their inoperative position, as shown in Figure 7, when moving from one place to another. When the mower is to be started, the operator, after removing the lock pin 194 from the bar 187, or lug 196 of the sickle bar 27, manipulates the control lever 147 to partially release the brake 177, whereby the swing frame and sickle bar are lowered under gravitational influence, until said parts assume their operative positions, shown in Figure 6, it being understood that during such downward movement of the sickle bar, the chain 171 is free to unwind from the drum 163 because of the outer member or drum 142 of the clutch 138 being free to rotate on the shaft 134. The auxiliary motor E may be started before or after the sickle has been lowered to its operative position, as the driving connection between the pitman shaft 47 and the motor drive shaft 91 is not affected by the angular position of the sickle bar with respect to the swing frame. When the swing frame has been lowered to its operative position, as shown in Figure 6, it is free to follow varying ground contours as the chain 174 is then slack. If it is desired to support the sickle head in a position out of direct contact with the ground, it may readily be accomplished by simply inserting the lock pin 194 in one of the apertures 192 of the bar 187. The swing frame is raised to the desired level by first angularly adjusting the sickle bar under power of the auxiliary motor E by moving the control lever 147 rearwardly to shift the cone 146 into operative engagement with the dogs 144, whereby the chain 171 is wound upon the winding drum 163. To thus vertically translate the swing frame by the power of the motor E, the sickle bar first relatively pivots upon the swing frame until it reaches a position to tighten the chain 174, whereupon the swing frame immediately begins to elevate, as a result of the tautness of the chain 174. After the swing frame has been locked in adjusted position by the lock pin 194, the sickle bar is readjusted to correspond to the slope to be mowed and is held by the energizing brake 177. The operation of the sickle is controlled entirely by manipulation of the control lever 97 and the position of the sickle bar is controlled by the manipulation of the control lever 147.

From the foregoing, it is apparent that the operator, from a seat on the tractor, may conveniently control the operation of the sickle and also the position of the sickle bar, all under power of the auxiliary motor E carried on the tractor frame. The mower and all its operating parts, as hereinbefore stated, are operated entirely independently of the tractor motor 18, whereby the load imposed upon the tractor motor to propel the vehicle, will not affect the operation of the mower. The speed of the sickle bar may, as hereinbefore stated, be controlled by adjustment of the governor controlling the speed of the auxiliary motor, whereby the sickle may be operated at the proper speed required for the particular growth or grass being mowed.

Figure 10:
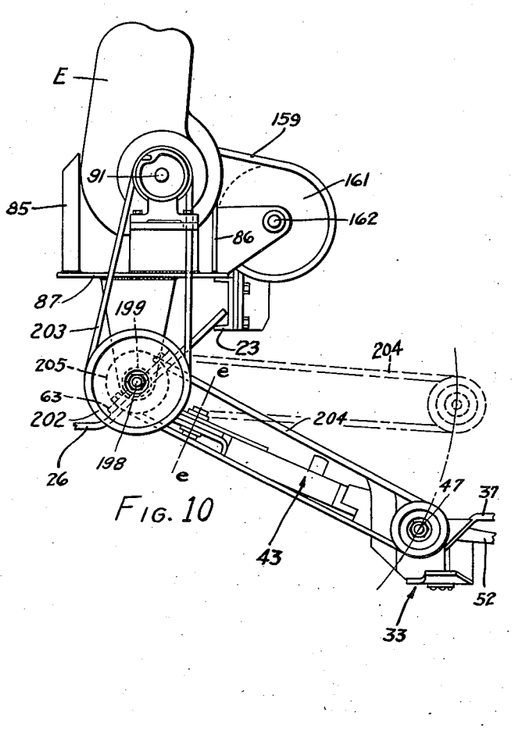
Figure 10 is a view showing a modified form of flexible drive between the auxiliary motor drive shaft and the pitman shaft with some of the mower parts omitted.
Figures 11, 12:
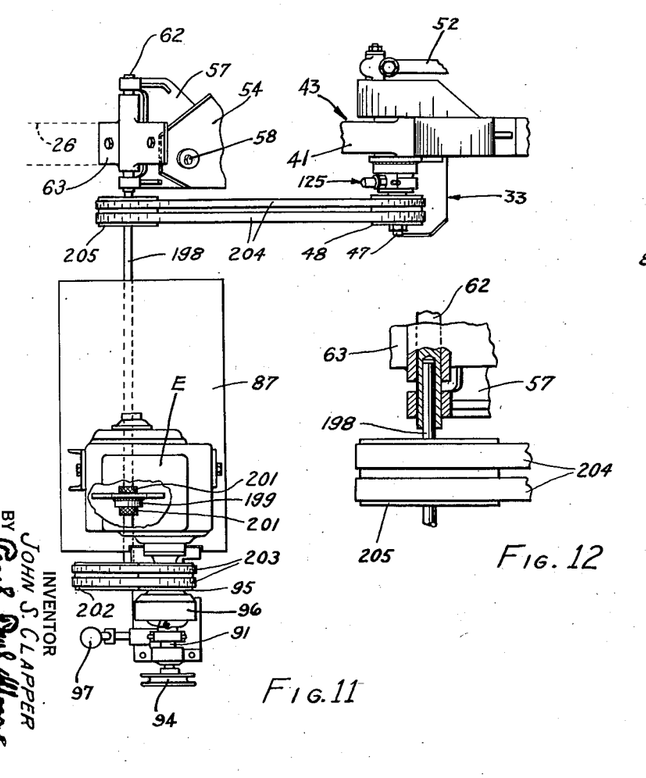
Figure 11 is a plan view of Figure 10.
Figure 12 is an enlarged detail view showing one of the supporting bearings for the countershaft, shown in Figure 11.

In Figures 10, 11, and 12, I have shown a flexible drive between the drive shaft 91 of the auxiliary motor and the pitman shaft 47 which comprises a counter shaft 198, one end of which is shown mounted in a suitable bearing 199, which may be supported upon the base plate 87 of the auxiliary motor E. The opposite end of the counter shaft 198 may be supported in a bearing provided in one end of the hinge pin 62 pivotally connecting the swing frame 43 to the bracket 63 secured to the cradle 28 of the tractor frame, as shown in Figure 12. Suitable collars 201 are secured to the shaft 198 at opposite sides of the bearing 199 to prevent longitudinal movement of the shaft 198 in its bearings.

A double sheave or pulley 202 is secured to the counter shaft 198 and is driven from the pulley 95 on the engine drive shaft 91 by a double belt 203, similar to the double belt 102, shown in Figure 6. Power is transmitted from the counter shaft 198 to the pitman shaft 47 by a double belt 204 having a driving connection with a pulley 205 on the counter shaft and the pitman shaft pulley 48, as clearly shown in Figures 10 and 11. The belts 204 and pulleys 205 may be removed from the counter shaft 198 by loosening the forward collar 201, whereby the counter shaft may be withdrawn from the bearing in the hinge pin 162.

The drive 204, shown in Figures 10 and 11, permits free vertical swinging movement of the outer end of the swing frame 43, as indicated by the dotted lines in Figure 10, whereby the sickle bar may follow the contour of the ground, without affecting the operation of the drive 204, between the counter shaft 198 and pitman shaft 47. The drive 204 also permits rearward swinging movement of the sickle bar and swing frame about the axis c—c. In the construction shown in Figures 10 and 11, the sickle bar is adjusted by power from the auxiliary motor E by manipulation of the control lever 147, in a manner similar to the construction shown in Figures 1 to 9.

I claim as my invention:

1. A tractor mower comprising a mobile frame provided with a motor for propelling it, a swing frame pivoted to the mobile frame and extending laterally therefrom, a sickle bar pivotally connected at one end to the swing frame and having a sickle mounted for reciprocal movement thereon, mechanism for imparting swinging movements to the sickle bar and the swing frame to move the sickle bar into or out of operative position with respect to the ground, a second motor on the mobile frame, a driving connection between said second motor and the sickle, whereby the sickle may be driven independently of the tractor motor, and control means operatively connecting said mechanism to the second motor, whereby the second motor may also be utilized to operate said mechanism to position the sickle bar.

2. A power driven mowing machine comprising a mobile frame, a swing frame pivoted to the mobile frame, a sickle bar pivotally connected at one end to the swing frame and having a sickle mounted thereon, a motor on the mobile frame provided with a drive shaft, a pitman shaft mounted in the axis of the sickle bar connection to the swing frame and having a pitman connecting it to the sickle, a counter shaft mounted in spaced parallel relation to the pitman and motor shafts, pivoted arms for supporting the counter shaft for swinging movement about the axis of the motor shaft, driving connections between the motor, counter, and pitman shafts for transmitting power from the motor to the sickle, and a sickle bar adjusting mechanism operatively connected to the motor, whereby the sickle bar may be vertically adjusted by operation of the motor, said swingable countershaft maintaining operative the driving connections between the motor and sickle, regardless of the position of the sickle bar.

3. A power driven mowing machine comprising a mobile frame, a swing frame pivoted to the mobile frame, a sickle bar pivotally connected at one end to the swing frame and having a sickle mounted thereon, a motor on the mobile frame provided with a drive shaft, a pitman shaft mounted in the axis of the sickle bar connection to the swing frame and having a pitman connecting it to the sickle, a counter shaft mounted in spaced parallel relation to the pitman and motor shafts, pivoted means for supporting the counter shaft on the mobile frame and whereby it is adapted for swinging movement about the axis of the motor shaft, means for supporting the counter and pitman shafts in accurately spaced relation, and suitable driving connections between the motor, pitman, and counter shafts for transmitting power from the motor to the sickle.

4. A power driven mowing machine comprising a mobile frame, a swing frame pivoted to the mobile frame, a sickle bar pivotally connected at one end to the swing frame and having a sickle mounted thereon, a motor on the mobile frame provided with a drive shaft, a sheave on said drive shaft, a pitman shaft mounted in the axis of the sickle bar connection to the swing frame and having a crank pin, a sheave secured to the pitman shaft, a pitman having one end connected to the crank pin and its opposite end to the sickle, a counter shaft mounted in spaced parallel relation to the pitman and motor shafts and adapted for swinging movement about the axis of the motor shaft, a sheave secured to the counter shaft, belts interconnecting said sheaves for transmitting power from the motor to the sickle, and clutch means whereby the power of the motor may be utilized for vertically adjusting the sickle bar relative to the ground.

5. In combination with a mobile frame, a swing frame pivoted to the mobile frame and adapted for horizontal and vertical movements, a sickle bar pivotally connected at one end to the swing frame, whereby the sickle bar may be swung to a vertical inoperative position, a motor mounted on the mobile frame, power transmitting means operatively connecting the motor to the sickle bar, whereby the sickle bar may be swung upwardly to an inoperative position by the power of the motor, and means interconnecting the sickle bar and vehicle frame whereby when the sickle bar reaches a predetermined point in its upward movement, continued operation of the motor may elevate the swing frame.

6. In combination with a mobile frame, a swing frame pivoted to the mobile frame and adapted for horizontal and vertical swinging movements, a sickle bar pivotally connected at one end to the swing frame and adapted to be swung to an upright inoperative position thereon, a sickle mounted for reciprocal movement on the sickle bar, a motor on the mobile frame for driving the sickle, power transmitting means between the sickle bar and the motor whereby the sickle bar may be vertically adjusted relatively to the ground by the power of said motor, means for counterbalancing the sickle bar on the swing frame, and spring means for counterbalancing the combined weights of the sickle bar and swing frame, whereby a portion of the weight thereof is transferred to the mobile frame, said counterbalancing means relieving the motor of excessive load, when adjusting the sickle bar.

7. In combination with a mobile frame, a swing frame pivotally mounted thereon for swinging movement in a vertical plane, a sickle bar pivotally connected at one end to the swing frame and vertically adjustable with respect to the ground by swinging movement of the swing frame, a guide on the mobile frame, a locking bar slidable in said guide and having a connection with the swing frame, means engageable with said guide and said locking bar for securing the locking bar against longitudinal movement in said guide, thereby to secure the sickle bar in adjusted position with respect to the ground, and power means for vertically adjusting the sickle bar.

8. In combination with a mobile frame, a swing frame pivotally mounted thereon for swinging movement in a vertical plane, a sickle bar pivotally connected at one end to the swing frame and vertically adjustable with respect to the ground by swinging movement of the swing frame, a guide on the mobile frame, a locking bar slidable in said guide and having a link connection with the swing frame, and said locking bar having a plurality of spaced apertures therein adapted to receive a lock pin, thereby to secure the locking bar against movement and retain the swing frame and sickle bar in adjusted position with respect to the ground.

9. In a mowing machine of the class described, a mobile frame, a swing frame pivoted thereto, a sickle bar pivotally connected at one end to the swing frame and having a sickle mounted thereon, a motor on the mobile frame provided with a drive shaft, a pitman shaft mounted in the axis of the sickle bar connection to the swing frame and having a pitman connecting it to the sickle, a counter shaft, a bearing member for the counter shaft, a pair of arms secured to said bearing member and laterally extending therefrom and pivotally connected to the mobile frame in the axis of the motor shaft, whereby the bearing member is adapted for swinging movement about the axis of the motor shaft, and driving connections between the motor, counter, and pitman shafts for transmitting power from the motor to the sickle.

10. In a mowing machine of the class described, a mobile frame, a swing frame pivoted thereto, a sickle bar pivotally connected at one end to the swing frame and having a sickle mounted thereon, a motor on the mobile frame provided with a drive shaft, a pitman shaft mounted in the axis of the sickle bar connection to the swing frame and having a pitman connecting it to the sickle, a counter shaft, means supporting the counter shaft on the mobile frame whereby it is adapted for swinging movement about the axis of the motor shaft, a belt drive for transmitting power from the motor drive shaft to the counter shaft, and a second belt drive for transmitting power from the counter shaft to the pitman shaft, the swingable mounting of the counter shaft permitting the swing frame and sickle bar to be vertically adjusted on the mobile frame during operation of the sickle by said belt drives.

11. In a mowing machine of the class described, a mobile frame, a swing frame pivoted thereto, a sickle bar pivotally connected at one end to the swing frame and having a sickle mounted thereon, a motor on the mobile frame provided with a drive shaft, a pulley on said drive shaft, a pitman shaft mounted in the axis of the sickle bar connection to the swing frame and having a crank pin, a pulley secured to the pitman shaft, a pitman connecting the crank pin to the sickle, a counter shaft, means for supporting the counter shaft in spaced parallel relation to the pitman and motor shafts and whereby said counter shaft is adapted for swinging movement about the axis of the motor shaft, a pair of pulleys secured to the counter shaft, a belt having driving connections with the pulley on the motor shaft and one of the pulleys on the counter shaft, a second belt drivingly connecting the other pulley on the counter shaft to the pitman shaft pulley and completing the drive between the motor and the sickle, said belts and counter shaft permitting free vertical and horizontal movements of the sickle bar with respect to the mobile frame during operation of the sickle and adjustments of the sickle bar.

12. In an apparatus of the class described, a mobile frame having power means for propelling it, a swing frame pivotally mounted on the mobile frame, a sickle bar pivotally connected at one end to the swing frame and having a sickle mounted for reciprocal movement thereon, an auxiliary motor on the mobile frame for driving the sickle independently of the power means of the mobile frame, a mechanism for vertically adjusting the swing frame and sickle bar comprising a clutch having operative connections with the auxiliary motor and said mechanism, a control lever for rendering the clutch operable to drive said mechanism, whereby the sickle bar may be vertically adjusted with respect to the ground by the power of the auxiliary motor, and a self-energizing brake associated with the clutch adapted to secure the sickle bar in adjusted position, said brake also being operable to control downward movement of the sickle bar against gravity.

13. In an apparatus of the class described, a mobile frame having power means for propelling it, a swing frame pivotally mounted on the mobile frame, a sickle bar pivotally connected at one end to the swing frame and having a sickle mounted for reciprocal movement thereon, an auxiliary motor on the mobile frame for driving the sickle independently of the power means of the mobile frame, a mechanism for vertically adjusting the swing frame and sickle bar comprising a clutch having operative connections with the auxiliary motor and said mechanism and whereby the sickle bar may be vertically adjusted with respect to the ground by the power of the auxiliary motor, a self-energizing brake associated with the clutch adapted to secure the swing frame and sickle bar in adjusted position against gravity, and a single control lever for rendering the clutch operable to drive said mechanism and elevate the swing frame and sickle bar, and whereby the brake may be operated to control downward movement of the sickle bar against gravity.

14. A power driven mowing machine comprising a movable frame, a swing frame, a pivot supporting the swing frame on the mobile frame whereby the outer end of the swing frame is adapted for swinging movement in a vertical plane, a sickle bar pivotally connected at one end to the outer end of the swing frame and having a sickle mounted thereon, a second motor on the mobile frame provided with a drive shaft, a pitman shaft mounted on the swing frame in the axis of the sickle bar connection to the swing frame, a pitman connecting the pitman shaft to the sickle, a counter shaft mounted in the axis of the swing frame pivot and having a driving connection with the drive shaft, and means providing a driving connection between the counter shaft and pitman shaft.

15. A mobile frame having a motor for propelling it, a sickle bar support hinged to said frame, a sickle bar pivotally hinged to the support and having a sickle mounted for reciprocal movement therein, and a second motor on the mobile frame connected to the sickle bar and capable of imparting reciprocating movement to the sickle independent of traveling movement of the mobile frame.

JOHN S. CLAPPER.